Dec. 30, 1930.  W. C. STEVENS  1,787,413
TIRE BUILDING MACHINE
Filed May 19, 1926    5 Sheets-Sheet 1

INVENTOR.
WILLIAM C. STEVENS.
BY
ATTORNEY.

INVENTOR.
WILLIAM C. STEVENS.

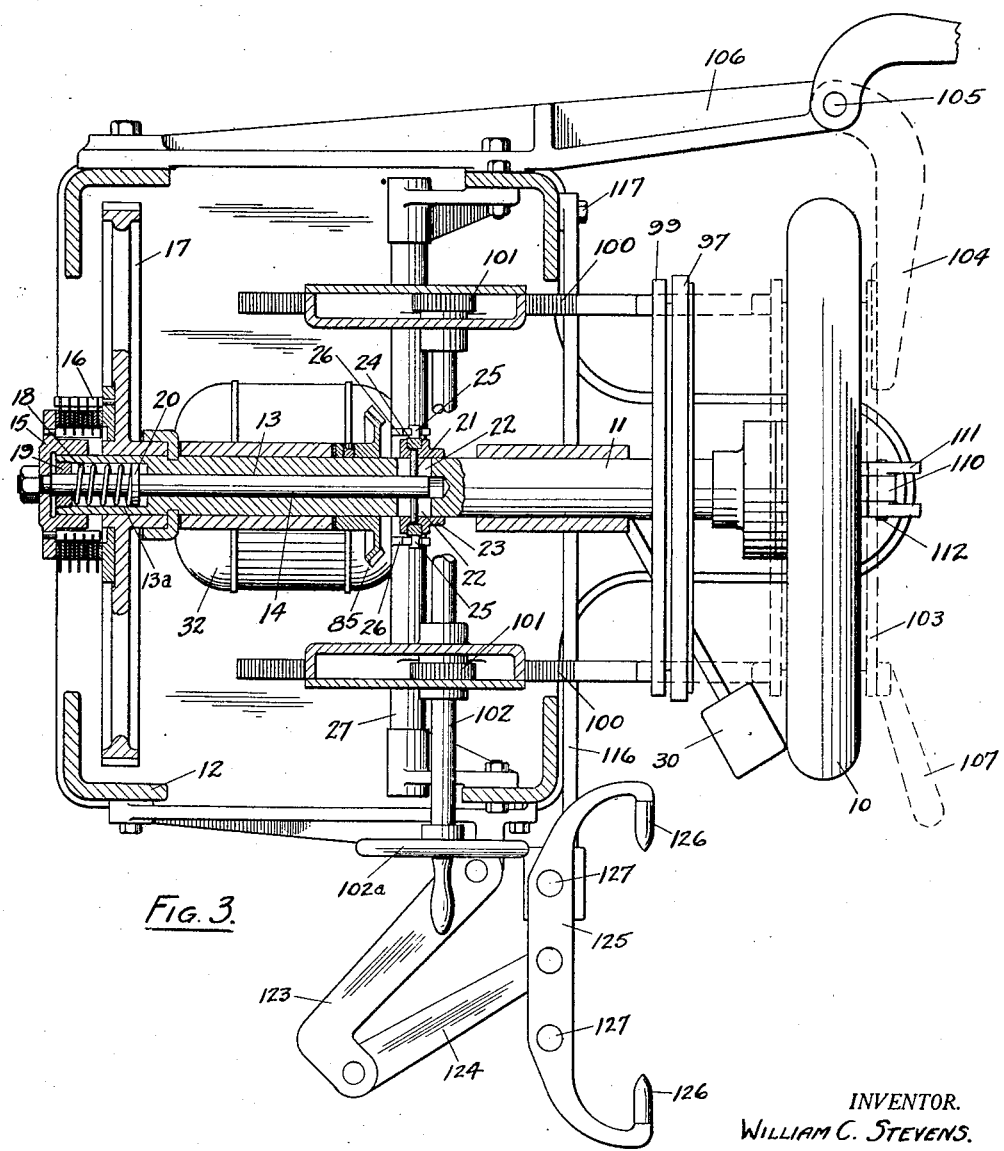

Dec. 30, 1930.  W. C. STEVENS  1,787,413
TIRE BUILDING MACHINE
Filed May 19, 1926  5 Sheets-Sheet 4
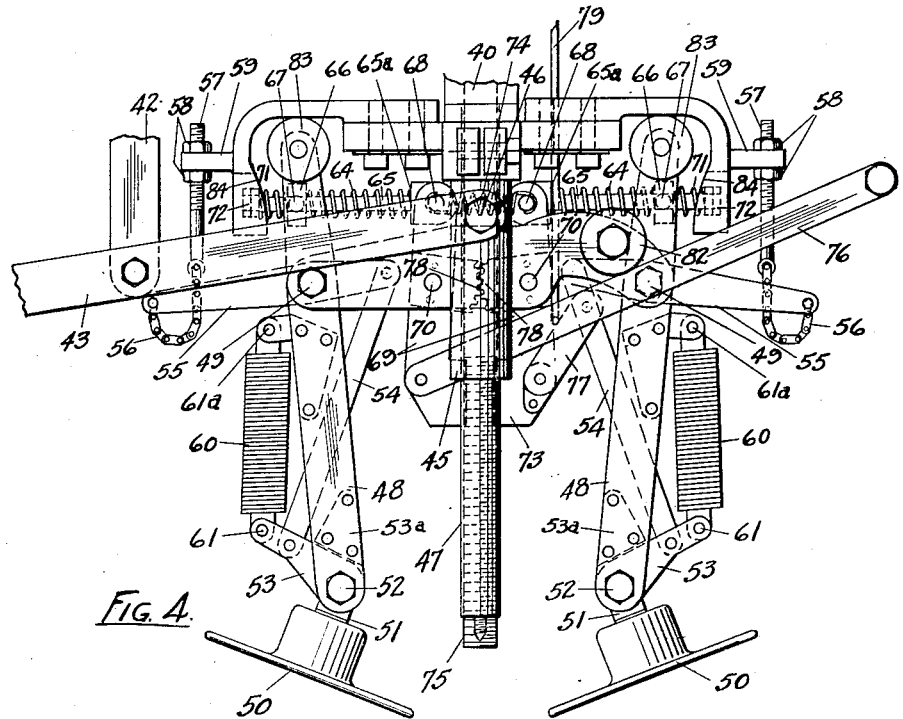
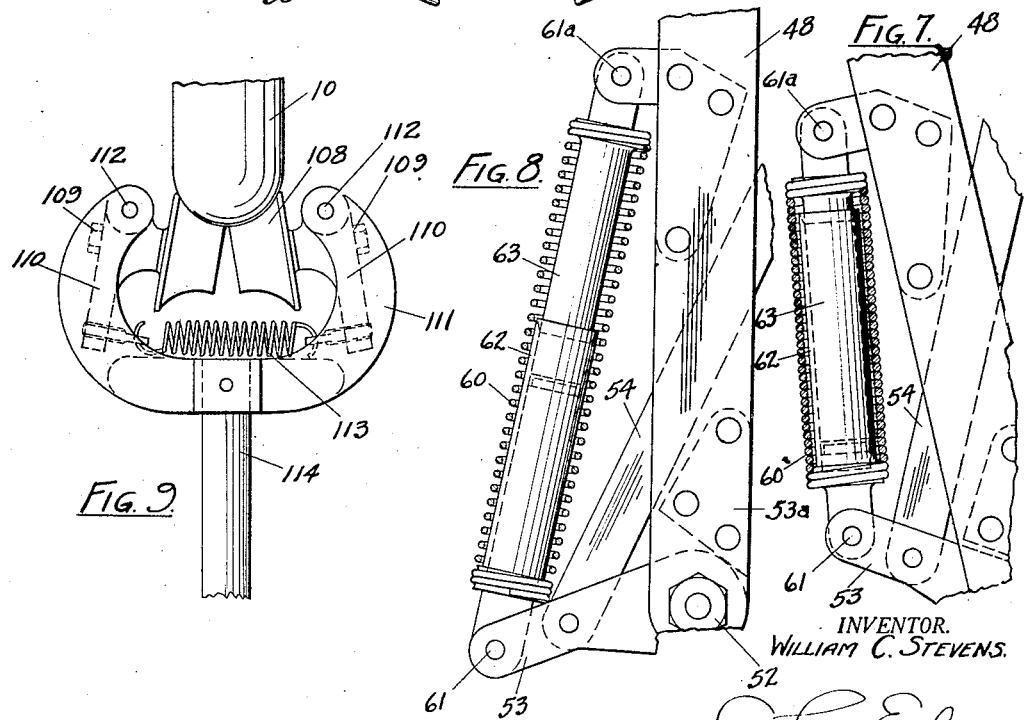
INVENTOR.
WILLIAM C. STEVENS.
ATTORNEY.

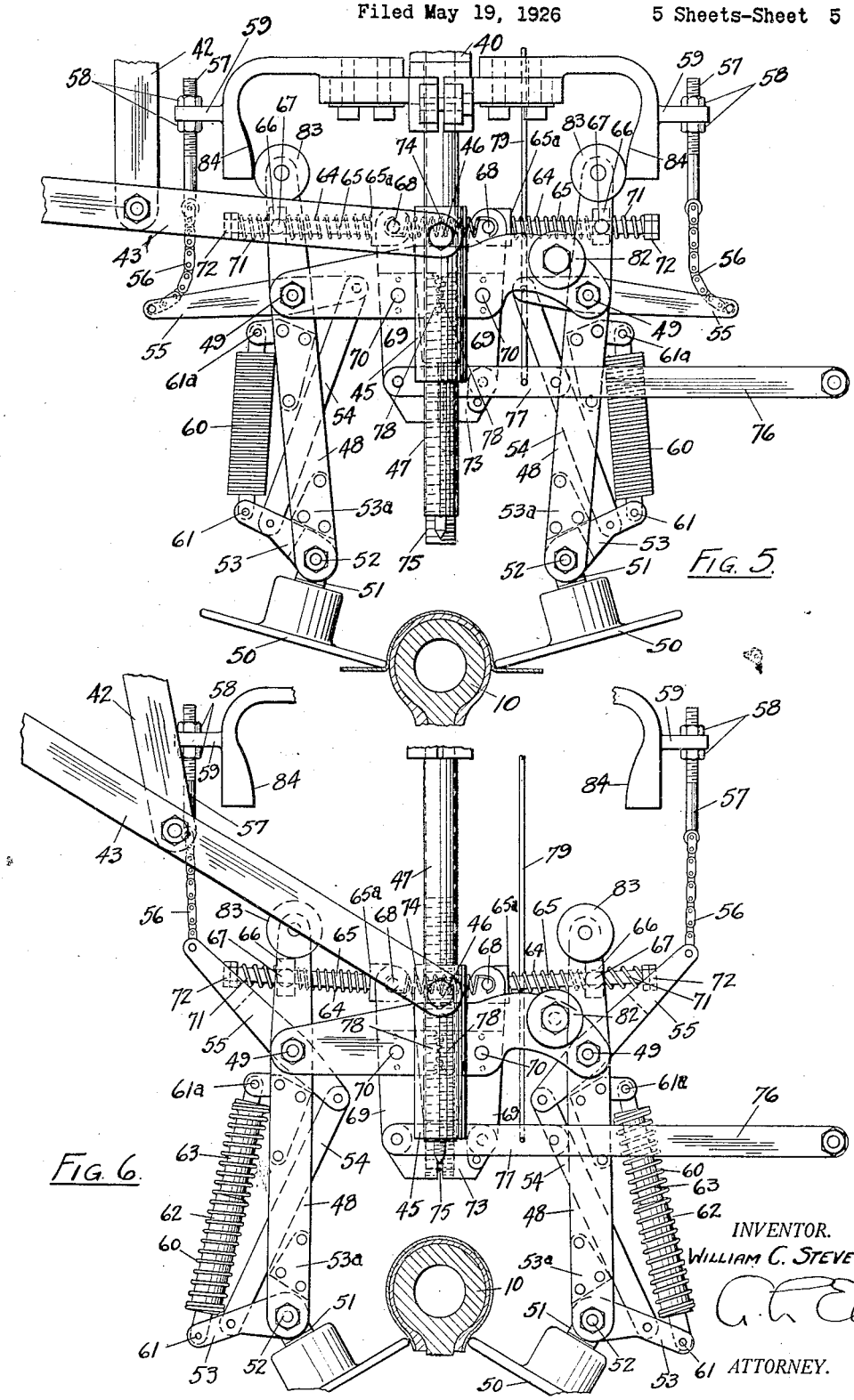

Patented Dec. 30, 1930

1,787,413

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

TIRE-BUILDING MACHINE

Application filed May 19, 1926. Serial No. 110,143.

This invention relates to machines for building pneumatic tire casings.

The general purpose of the invention is to provide an improved machine which may be termed of a vertical type, that is, in which the various tire forming instrumentalities are actuated vertically against the rotatable tire building core, and especially adapted to the building of tires by the band method, that is, that method according to which the plies and tread are applied to the core as endless bands rather than in strip form.

Among the objects of the invention are to provide an improved automatic ply-stitcher mechanism which may be swung to or from stitching relation with the core and is fed for its stitching operation by automatically controlled power means.

Other objects are to provide an improved bead setting mechanism, an improved tread-stitcher mechanism, an improved power means and controls and an improved adhesion breaking device for facilitating removal of completed casings from the forming core.

The foregoing and other objects are obtained by the construction illustrated in the accompanying drawings and more fully described below. It is to be understood that the invention is not limited to the specific form thereof shown and described.

Of the accompanying drawings,

Figure 3 is a sectional plan on line 3—3 of Figure 1 with the bead-setting mechanism illustrated in use;

Figure 4 is a detail elevation of the ply-stitcher mechanism;

Figure 5 is a similar view illustrating the operation of the ply-stitcher about the sides of the core;

Figure 6 is a similar view illustrating the operation of the ply-stitcher about the inner periphery of the core;

Figures 7 and 8 are details illustrating the spring control for the mechanism provided to change the angularity of the ply-stitcher discs; and Figure 9 is a detail illustrating the operation of the tread stitcher mechanism.

*The core and operating mechanism*

Figure 1:
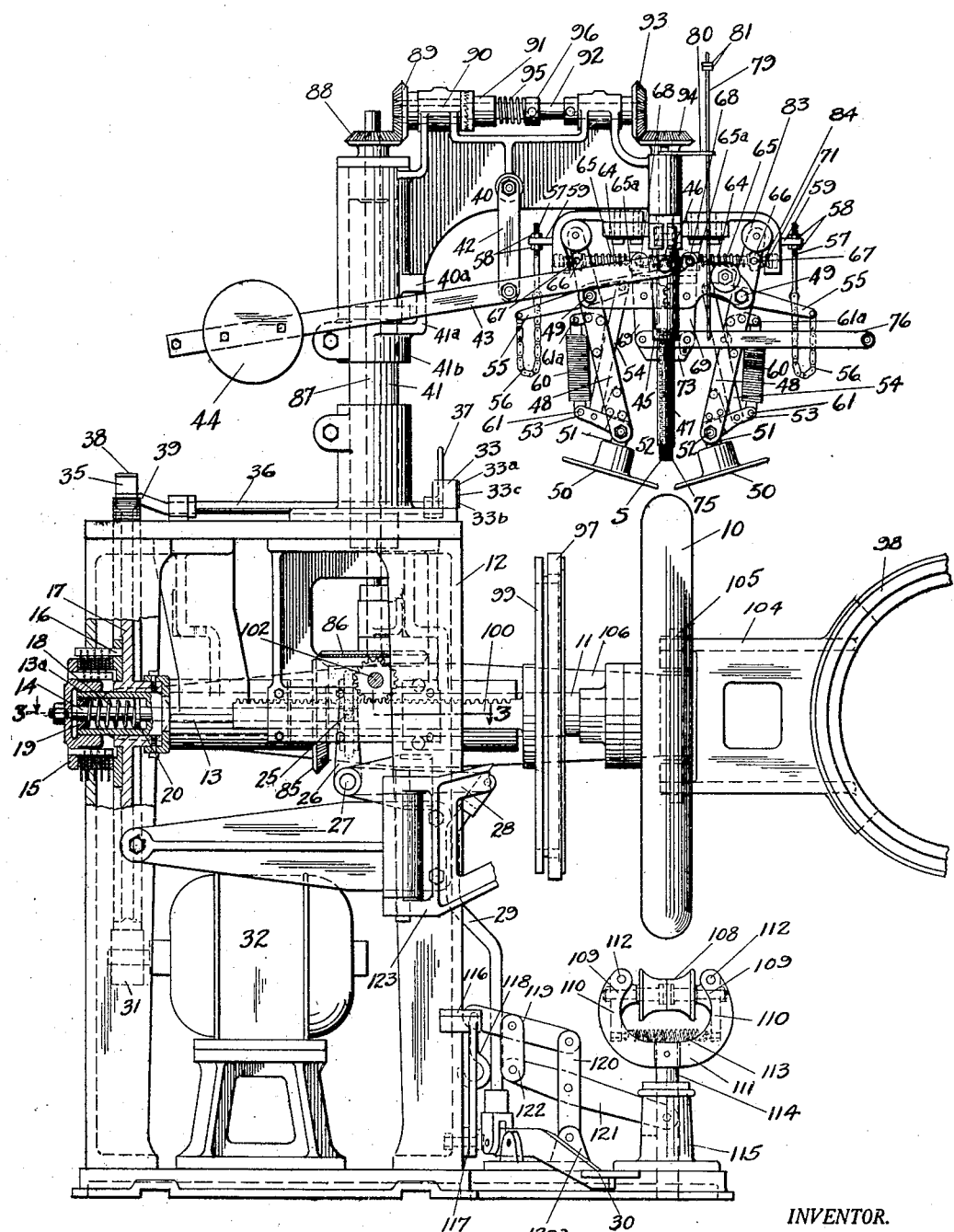
Figure 1 is a side elevation, partly in section, of a machine embodying the invention.

The tire building core is shown at 10, it preferably being of that type in which the core sections are carried on a collapsible chuck permanently mounted on a core driving shaft 11 journaled in a supporting frame or table 12. Shaft 11 is formed with a bore 13 in its rear end in which is received a shiftable rod 14 connected to one member 15 of a clutch, the other member 16 of which is connected to a drive gear 17 journaled on shaft 11. Clutch members 15 and 16 are normally held in engagement by a spring 18 encircling rod 14 in an enlarged continuation 13ª of bore 13, it being held in place by a plug 19 and exerting its force on a flange 20 on rod 14.

For disengaging the clutch when necessary during the tire building operations, rod 14 is arranged to be shifted by pin 21, connected thereto and projecting through longitudinal slots 22, 22 into a shiftable collar 23 having therein a peripheral groove in which is seated a shifting ring 24 having studs 25, 25 thereon arranged to be engaged by a shifting yoke member 26 on a rock shaft 27 journaled in frame 12. Shaft 27 has an arm 28 connected thereto, which, in turn, is connected by a link 29 to a clutch operating pedal 30. Driving of gear 17 is preferably effected by means of a pinion 31 on the shaft of a variable speed motor 32 controlled by suitable switches 33 and 34 mounted on the front of table 12. Switch 33 may include a button 33ª for a forward speed at one rate and a button 33ᵇ for a reverse speed at a different rate, button 33ᶜ being employed for starting and button 34ª for stopping. Thus a slow speed may be used in applying or centering the bands and other operations and a fast speed for the stitching operations. The clutch may also be disengaged during any of these operations to stop the core.

To economize on time, it is desirable to have a brake on the core-driving mechanism. To this end a brake shoe 35 adapted to engage gear 17 is mounted on a leaf spring 38 secured on table 10 so as normally to urge the brake against gear 17. Disengagement of the brake may be effected by means of a cam 39, on a rock shaft 36, the cam 39 being adapted to engage under leaf spring 38. Rock shaft 36 may be journaled on table 12 and actuated by a handle 37 secured thereon.

The ply-stitcher and drive mechanism therefor

The ply-stitcher mechanism includes a bracket 40 pivoted on a vertical standard 41 extending up from table 12 to swing in a horizontal plane from a position remote from the core 10 to a position above the same. A stop 41$^a$ on an adjustable collar 41$^b$ is arranged to position the stitcher properly over the core by engagement with a lug 40$^a$ on bracket 40. Pivotally depending from bracket 40 is a link 42 on which is pivoted a lever including members 43, 43, one end of which supports the stitching unit and the other end of which is provided with adjustable counterweights 44, 44 normally holding the stitcher unit elevated.

The stitcher unit comprises a supporting frame including members 45, 45 pivoted at 46, 46 on lever members 43 and adapted to slide on vertical guides 47, 47 secured on bracket 40 and extending downwardly therefrom. The stitcher frame 45 has stitcher arms 48, 48 pivoted on its opposite ends at 49, 49, which arms have mounted on their lower ends stitcher discs 50, 50 journaled on spindles 51, 51 pivoted in the ends of the stitcher arms at 52, 52 and adapted to be angularly shifted by arms 53, 53. Arms 53 have connected thereto actuating links 54, 54 connected to the inner ends of levers 55, 55 pivoted at 49, 49 on frame 45, the outer ends of levers 55 being connected by flexible members such as chains 56, 56 to bolts 57, 57 adapted to be secured in vertically adjustable positions by means of nuts 58, 58 to brackets 59, 59 fixed on bracket 40. Return of the discs 50 to their normal positions after actuation thereof by the above described mechanism is effected by means of springs 60, 60 connected to the angle-changing arms 53 at 61, 61 and to the stitcher arms at 61$^a$, 61$^a$. Stops 53$^a$, 53$^a$ are provided on stitcher arms 49 to hold the stitchers 50 in their initial angular positions. The return actions of springs 60 are retarded by telescoping link members 62, 62 and 63, 63, respectively, the cylinders and pistons of suitable dash pots (Figures 7 and 8).

Pressure of the stitcher discs 50 against the core is effected by means of compression springs 64, 64 encircling bolts 65, 65 between shoulders 65$^a$, 65$^a$ on the bolts and collars 66, 66, shiftable on bolts 65 and pivotally mounted as at 67, 67 on stitcher arms 48, bolts 65 being pivoted at 68, 68 onto levers 69, 69 pivoted at 70, 70 and forming part of the stitcher feeding mechanism. Reaction cushioning compression springs 71, 71 are arranged on bolts 64 between collars 66 and nuts 72, 72. The above-described devices for pressing the stitcher against the core are interlocked with the stitcher feeding means for a purpose which will later appear.

The feeding means for the stitcher comprises a split nut 73, the two halves of which respectively are supported by levers 69, 69 and which parts of the nut are normally held apart by means of a tensile spring 74 connecting the upper ends of levers 69. The split nut 73 is arranged to engage a vertical threaded shaft 75 journaled in bracket 40 and may be actuated by means of a lever 76 pivotally connected at one end to the lower end of one lever 69 and operating a toggle arm 77 connected to the lower end of the other lever 69 and to lever 76 intermediate its ends. The levers 69 are interconnected by meshing segmental gears 78, 78 connected thereto to pivot therewith about the pivots 70, whereby the clamping of the two nut parts onto the shaft 75 will be equalized.

Lever 76 provides means for manually initiating the stitching operation. To the end that the stitchers will be automatically withdrawn from the core at the completion of such operation, lever 76 has pivotally connected thereto a rod 79 extending up through an aperture in a trip plate 80 secured on bracket 40 and having adjustable nuts 81, 81 on its upper end adapted to engage plate 80 as the stitcher unit moves downwardly and thus to break the toggle acting on the nut halves, whereby spring 74 will disengage the nut from the shaft 75 and will also be effective on lever 48 through bolts 65 to release pressure of springs 64 on said levers and to urge discs 50 apart, whereby they will clear the core as counterweights 44 cause the stitcher to return to its normal elevated position. A bumper in the form of a rubber roller 82 is provided on frame 45 in the path of lever 76 so that when the feeding device is tripped, the blow of the lever 76 against the stitcher frame will be cushioned.

When in use for making large tires, it is advantageous, in order to avoid injury to the fabric plies by undue pressure of the stitcher discs, to provide positive means for separating the discs against the action of springs 64 as the discs progress about the outer core periphery. Accordingly, the upper ends of stitcher arms 48 may be provided with rollers 83, 83 adapted to track on fixed cams 84, 84 on frame members 59, 59 for this purpose.

Driving of the feed screw shaft 75 may be accomplished by means operable from the core drive shaft such as a bevel gear 85 on said shaft meshed with a bevel gear 86 on a vertical shaft 87 extending up through standard 41 and having a bevel gear 88 on its upper end, gear 88 being meshed with a bevel gear 89 on a shaft 90 journaled in bracket 40 and connected by jaw clutch 91 to a shaft 92 on which is a bevel gear 93 meshed with a bevel gear 94 on shaft 75. The members of clutch 91 are normally held engaged by a compression spring 95 retained by a collar 96.

The ply-stitcher mechanism may have mounted thereon a ply-centering sight S to aid the operator in properly positioning the bands on the core for the stitching operation.

The bead placing devices

These devices include an inner bead placing ring 97 and an outer bead placing ring 98 adapted to support the beads in a known manner. The inner bead placing ring 97 is removably mounted on annular holder 99 carried by rack bars 100, 100 arranged to slide in frame 12 and having meshed therewith pinions 101, 101, on a common shaft 102 journaled in frame 12 and adapted to be operated by a hand wheel 102ª to move the bead placing ring 97 toward and from the inner side of the core (Figure 3).

The outer bead setting ring 98 is removably mounted on an annular holder 103 supported on an arm 104 pivoted at 105 on a bracket 106 so that the ring 98 may be swung against the outer side of the core (Figure 3). A handle 107 is provided on holder 103 to facilitate the swinging thereof into place.

The tread stitcher mechanism

Figure 2:
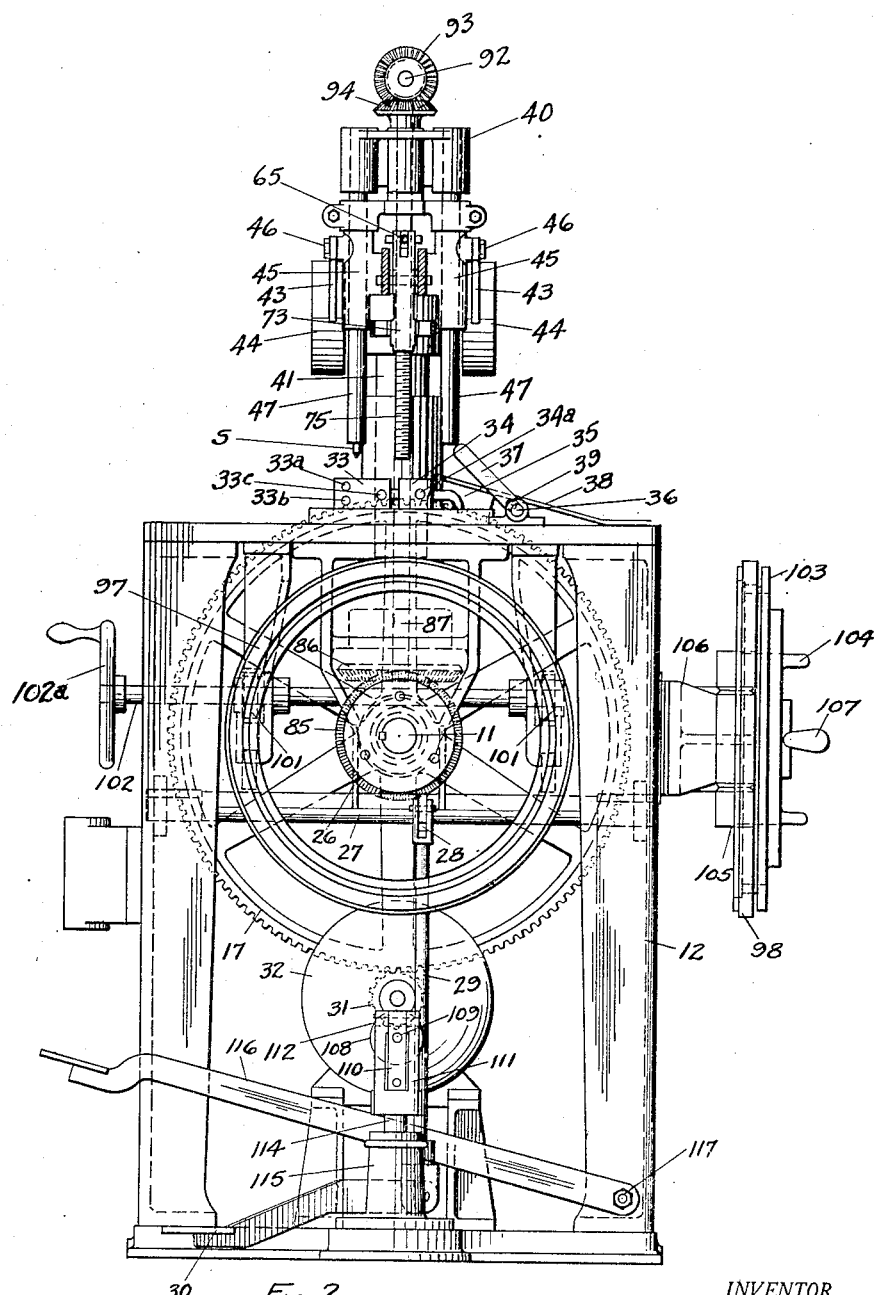
Figure 2 is a front elevation, partly in section, thereof.

The tread stitcher comprises a two part, concave roller 108, split intermediate its ends, each half being journaled on a separate spindle 109, the spindles 109 normally being held in alignment by being secured in arms 110, 110 pivotally mounted on a vertically reciprocal yoke 111 at common pivots 112, 112, arms 110 being held in their normal positions by a tension spring 113 connecting the same. Yoke 111 is mounted on a vertically reciprocable rod 114 slidable in a supporting pedestal 115. Suitable means for urging the tread stitcher upwardly against the bottom of core 10 (Figure 9) are shown in Figures 1, 2 and 3. A pedal lever 116 is pivoted on frame 12 at 117 and is connected by a link 118 to a lever 119 which is one member of a system of levers including a vertical member 120 pivoted on a bracket 120ª, a lever 121 pivoted on member 120 and pivotally connected to rod 114 and a link 122 connecting lever 121 and lever 119. This system is adapted to convert the movement of pedal 116 along an arc into movement of rod 114 vertically.

The adhesion breaker

This device comprises an arm 123 pivoted on frame 12 to swing in a horizontal plane toward core 10 and having pivotally mounted thereon a toggle arm 124 on the free end of which is pivoted a double-hook member 125 having rollers 126, 126 journaled on the ends of the hooks and adapted to pass between the bead of a completed tire and the core, the device being adapted to be used on one side of the core or the other and to be manually operated by means of handles 127, 127.

The operation

An operator standing at the machine is furnished with endless bands of rubberized fabric plies, each band usually containing two plies and being of such circumference and width as to be adapted to be stretched about the core 10. The initial application of a band to the core is accomplished while the core is stationary, while the ply stitcher mechanism is swung on its pivot 41 away from its operating position shown in Figure 1, and while the inner and outer bead placing rings 97 and 98 and the tread stitcher are in their positions remote from the core. The ply stitcher unit may now be swung into its operative position and sight S employed to facilitate centering the band on the core for the stitching operation, which centering is accomplished by manipulating the band and intermittently rotating the core by use of the slow speed drive and operation of clutch pedal 30.

When the band is properly centered upon the core, the high speed switch is operated and the ply stitcher feed is thrown into operation by pulling down stitcher lever 76 which engages the split nut 73 with screw shaft 75 which is rotated continuously from the core drive shaft 11, as will be understood. This effects feeding of the stitcher frame 45 downwardly.

With the specific type of stitcher shown, the stitcher discs 50 will be positively separated by cams 84 as they travel down about the outer periphery of the core to reduce the pressure of the discs on this portion. Springs 64 accordingly urge the discs against the core with a pressure limited by the positive action of the cams. Bolts 57 are so adjusted that the angle-changing mechanism does not become effective until the stitchers 50 pass the widest portion of the core (Figures 5 and 6).

In passing downwardly about the inner portions of the core, the angle-changing devices are operated since the chains 56 hold the outer ends of the levers 55 against further downward movement, thus causing them to swing on their pivots and through links 54 and arms 53 to swing the journals 51 of discs 50 inwardly.

Nuts 81 are so adjusted on rod 79 that when stitcher discs 50 have progressed sufficiently down about the core to completely stitch a band in place, the nuts 81 will engage trip plate 80 and the pull resulting in rod 79 will break the toggle action of lever 76 and link 77 on nut parts 73 so that spring 74 will withdraw them from engagement with the screw 75 and simultaneously will draw bolts 65 inwardly to separate stitchers 50 whereby, during the return movement of the stitcher frame 45 to its initial upper position under the action of weights 44, the stitchers 50 will clear core 10. Such return movement of the stitcher is effected by weights 44 immediately upon disengagement of nut 73 from shaft 75.

Upon the upward movement of the ply stitcher unit due to the automatic tripping action described, the operating forces of chains 56 on levers 55 are released suddenly. Springs 60 effect the return of the stitchers 50 to their initial angular positions, but dashpots 62, 62 prevent too rapid movement thereof against stops 53ª. The desired number of inner plies are applied in the manner described above.

The operations of placing the beads are next performed (see Figure 3), the core not being rotated during these operations. The beads may have been mounted on rings 97 and 98 at any suitable time, the inner bead being now affixed to the partially constructed carcass on core 10 by operation of hand-wheel 103 to press the bead against the side of the carcass and the outer bead being pressed against the side of the carcass by swinging holder 103 to carry the bead against the carcass.

After placing the beads, the outer plies are applied and formed about the core by the ply-stitcher mechanism as will be understood.

The tread band, including the cushion and breaker, is preferably applied as a unit, being centered on the core in the manner of the plies. Stitching of the tread band is effected by rapidly rotating the core and depressing pedal 116, thus urging roller 108 upwardly, the two parts of the roller changing in angularity (Figure 9) as the foot pressure is increased so as to progressively stitch the thread in place from the crown thereof to its edges.

It will appear from the foregoing that a highly efficient machine has been provided for building tires, especially by the band method. Its vertical arrangement facilitates the employment of said method and is economical in the use of floor space. The power means and controls therefor, and the automatic features of the ply stitcher greatly speed up tire production.

Modifications of the invention may be resorted to without departing from the spirit thereof or the scope of the appended claims.

What is claimed is:

1. Apparatus for building tires, comprising a rotatable core, means for rotating the core, a stitcher unit pivoted to swing to or from operating position with the core, means yieldingly holding the stitcher mechanism away from the core, and means for feeding the stitcher mechanism towards the core for a stitching operation on the core, said means including a screw shaft, a split nut connected to the stitcher for releasably engaging the stitcher mechanism to the screw shaft, means for operating the split nut, means for rotating the screw shaft from the core rotating means, and automatic means for disconnecting said split nut from said shaft to allow said yielding means to move said stitcher mechanism away from the core.

2. Apparatus for building tires, comprising a rotatable core, means for rotating the core, a stitcher unit pivoted to swing to or from working relation with the core, means yieldingly holding the stitcher mechanism away from the core and means for feeding the stitcher mechanism towards the core for a stitching operation on the core, said means including a screw shaft, a split nut connected to the stitcher for releasably engaging the stitcher mechanism to the screw shaft, means for operating the split nut, and means for rotating the screw shaft from the core rotating means, and automatic means for disconnecting said split nut from said shaft to allow said yielding means to move said stitcher mechanism away from the core.

3. Apparatus for building tires, comprising a rotatable core, a stitcher mechanism movable toward and from the core, yielding means normally urging the stitcher away from the core, and power actuated means for feeding the stitcher toward the core, said means comprising a screw shaft, a split nut embracing the shaft, means normally holding the nut parts separated, toggle means for urging the nut parts together and locking them in engagement with the screw shaft, and adjustable means for automatically breaking the toggle at the end of a stitching operation.

4. Apparatus of the class described, comprising a rotatable tire building core, a stitcher device movable toward and from the core, said device including stitchers yieldingly held at a desired angle on their supporting arms, means normally urging the stitcher device away from the core, means for feeding the stitcher device toward the core, and means for determinately disconnecting the feeding means from the stitcher mechanism at the end of a stitching operation, whereby the stitcher may be employed with cores of various sizes.

5. Apparatus for building tire casings, comprising a rotatable core, a stitcher mechanism including a stitcher member, yielding means normally urging the stitcher against the core during a stitching operation, said stitcher mechanism being movable toward and from the core, additional yielding means for holding the stitcher in a determined angular relation, means normally urging the stitcher mechanism away from the core, means for feeding the stitcher mechanism toward the core, means connected to the stitcher unit adapted to be releasably connected to the feeding means, and means adapted to operate said connecting means into engagement with the feeding means, means normally urging the stitcher mechanism away from the core, said last named means being connected to the stitcher member, so as to urge it away from the core when the connecting means is released from engagement with the feeding means.

6. Apparatus for building tires, comprising a rotatable core, a stitcher mechanism including a stitcher element operable against a core, said stitcher mechanism being movable toward and from the core, means normally urging the stitcher away from the core, means for feeding the stitcher mechanism toward the core, adjustable means automatically disconnecting the feeding means at a determinate position of the stitcher, and yielding means normally holding the stitcher at a determined angle operated by disconnection of the feeding means from the stitcher mechanism for moving the stitcher element to that angular position whereby it will clear the core as the stitcher mechanism moves away from the core.

7. Apparatus for building tires, comprising a rotatable core, a stitcher mechanism movable toward and from the core, mechanisms for controlling movement of the stitcher mechanism so that it will move into engagement with the core for a stitching operation and be automatically returned at the end of a stitching operation, said mechanisms being adjustable to vary the range of movement of the stitcher, a stitcher element carried by the stitcher mechanism, yielding means urging said stitcher against the core, additional yielding means for holding the stitcher in a determined angular position throughout a portion of its travel, means for changing the angularity of said element as it moves over a portion of the core, and adjustable means controlling the operation of the angle-changing device to vary the range over which it is effective.

8. Apparatus for building tires, comprising a rotatable core, a stitcher mechanism movable toward and from the core, a stitcher element carried by the stitcher mechanism, yielding means urging said stitcher against the core, additional yielding means for holding the stitcher in a determined angular position throughout a portion of its travel, means for changing the angularity of said element as it moves over a portion of the core, and adjustable means controlling the operation of the angle-changing device to vary the range over which it is effective.

9. Apparatus for building tires, comprising a rotatable core and a stitcher mechanism movable toward and from the core, a relatively fixed support for the stitcher mechanism, an angularly adjustable stitcher carried by the mechanism and adapted to be urged against the core as the stitcher mechanism is fed toward the core, means on the stitcher mechanism for changing the angularity of the stitcher, and a flexible element secured to the support and to the last-named means, said element being of such length as to be ineffective on the angle-changing means as the stitcher is moved over the outer portion of the core, but to operate said means to change the angle of the stitcher as it moves over the inner portion of the core, the effective length of said element being adjustable.

10. Apparatus for building tires, comprising a rotatable core and a stitcher mechanism movable toward and from the core, a relatively fixed support for the stitcher mechanism, an angularly adjustable stitcher carried by the mechanism and adapted to be urged against the core as the stitcher mechanism is fed toward the core, means on the stitcher mechanism for changing the angularity of the stitcher, and a flexible element secured to the support and to the last-named means, said element being of such length as to be ineffective on the angle-changing means as the stitcher is moved over the outer portion of the core, but to operate said means to change the angle of the stitcher as it moves over the inner portion of the core.

11. Apparatus for building tires, comprising a rotatable core and a stitcher mechanism movable toward and from the core, an angularly adjustable stitcher carried by the mechanism and adapted to be urged against the core as the stitcher mechanism is fed toward the core, means on the stitcher mechanism for changing the angularity of the stitcher, and means for controlling the angle-changing means adapted to be ineffective on the angle-changing means as the stitcher is moved over the outer portion of the core, but to operate said means to change the angle of the stitcher as it moves over the inner portion of the core, said controlling means being adjustable to vary the range over which the angle-changing means is operable.

12. Apparatus for building tires, comprising a rotatable tire core and a stitcher mechanism movable toward and from the core, means normally urging the mechanism away from the core, releasable means for feeding the stitcher mechanism toward the core, a stitcher element carried by the mechanism, said element being angularly adjustable, means normally holding the element in one angular position, means for changing the angularity of the element, said angle-changing means being releasable, and means for retarding the movement of the element back to its normal angular position when the angle-changing means is released.

WILLIAM C. STEVENS.